United States Patent [19]
El-Hibri

[11] Patent Number: 6,075,100
[45] Date of Patent: Jun. 13, 2000

[54] TERNARY POLY(BIPHENYL ETHER SULFONE) RESIN BLENDS HAVING IMPROVED ENVIRONMENTAL STRESS CRACKING RESISTANCE

[75] Inventor: M. Jamal El-Hibri, Atlanta, Ga.

[73] Assignee: BP Amoco Corporation, Chicago, Ill.

[21] Appl. No.: 09/362,476

[22] Filed: Jul. 28, 1999

[51] Int. Cl.$^7$ ........................................... C08L 81/06
[52] U.S. Cl. ............................................ 525/535; 525/906
[58] Field of Search ............................................. 525/535

[56] References Cited

U.S. PATENT DOCUMENTS

| | | | |
|---|---|---|---|
| 4,108,837 | 8/1978 | Johnson et al. | 528/126 |
| 4,293,670 | 10/1981 | Robeson et al. | 525/436 |
| 4,743,645 | 5/1988 | Harris et al. | 524/456 |
| 5,086,130 | 2/1992 | Dickinson et al. | 525/537 |
| 5,144,001 | 9/1992 | Maresca | 528/171 |
| 5,164,466 | 11/1992 | El-Hibri et al. | 525/537 |
| 5,204,400 | 4/1993 | Kelly et al. | 524/405 |
| 5,916,958 | 6/1999 | Kelly et al. | 524/397 |

FOREIGN PATENT DOCUMENTS 847963   7/1970   Canada .

OTHER PUBLICATIONS

Pp. 945–968 of Kirk–Othmer's encyclopedia of Chemical Technology, vol. 19, (1996).

*Primary Examiner*—Ana Woodward
*Attorney, Agent, or Firm*—Thomas E. Nemo

[57] ABSTRACT

Ternary resin blends comprising a poly(biphenyl ether sulfone), a poly(ether sulfone) and a polysulfone, when molded, exhibit very attractive thermal and environmental resistance characteristics together with excellent mechanical properties. The molded articles comprising such ternary blends can be steam-sterilized repeatedly without stress cracking, and are not affected by corrosion-reducing additives such a morpholine.

7 Claims, No Drawings

TERNARY POLY(BIPHENYL ETHER SULFONE) RESIN BLENDS HAVING IMPROVED ENVIRONMENTAL STRESS CRACKING RESISTANCE

BACKGROUND OF THE INVENTION

This invention is directed to a molding composition comprising blends of a poly(biphenyl ether sulfone) resin. More particularly the invention is directed to improved molding resin compositions comprising a ternary blend comprising up to 50 wt % poly(biphenyl ether sulfone) resin, together with polysulfone resin and polyether sulfone resin. The ternary blends of this invention, particularly the preferred compositions, attain the very attractive thermal and environmental resistance characteristics of poly(biphenyl ether sulfone) resins, and display excellent mechanical properties.

Articles made from the ternary blends of this invention can be steam-sterilized repeatedly without stress cracking. Moreover they are not affected by corrosion-reducing additives such a morpholine, for example, and demonstrate good chemical resistance in contact with commonly used hospital cleaners and detergents.

Poly(aryl ether sulfones) have been known for nearly three decades. They are tough linear polymers that possess a number of attractive features such as excellent high temperature resistance, good electrical properties, and very good hydrolytic stability. A variety of poly(aryl ether sulfones) are commercially available, including the polycondensation product of 4,4'-dihydroxydiphenyl sulfone with 4,4'-dichlorodiphenyl sulfone described in, for example, Canadian Patent 847,963 and known in the art as poly(ether sulfone) (PES) resin, and the polymer of bisphenol-A and 4,4'-dichlorodiphenyl sulfone widely known in the art as polysulfone (PSF) resin, described in U.S. Pat. No. 4,108,837.

A third commercial poly(aryl ether sulfone) is the poly (biphenyl ether sulfone) resin, available from BP Amoco Polymers, Inc. under the trademark of Radel® R resin. This resin may be described as the product of the polycondensation of biphenol with 4,4'-dichlorodiphenyl sulfone and also is well known and described in the art, for example, in Canadian Patent No. 847,963.

Because of their excellent mechanical and thermal properties, coupled with outstanding hydrolytic stability, poly(aryl ether sulfones) have found wide application, particularly in producing extruded goods and molded articles for use where exposure to severe environments is contemplated. Parts molded from poly(biphenyl ether sulfone) resins have substantially better mechanical properties than those from other readily available poly(aryl ether sulfone) resins including PES and Polysulfone resins, and are generally more chemically resistant.

Although poly(aryl ether sulfone) resins are also highly resistant to mineral acids and salt solutions, when exposed to polar organic solvents they readily stress crack. Where increased environmental stress crack resistance is desired, blends of poly(aryl ether) resins have been employed to make them more acceptable for use in a solvent environment without substantially affecting their mechanical or electrical properties. Blends comprising polyetherimide resins and poly(aryl ether sulfone) resins are disclosed in U.S. Pat. No. 4,293,670 to have significantly improved environmental stress crack resistance and good impact strength. Environmentally resistant blends comprising poly(biphenyl ether sulfone) resins and poly(ether sulfone) resins are described in U.S. Pat. No. 5,086,130, and a variety of other blends have also been described in the art for these purposes including, for example, blends of poly(aryl ether sulfones) with polyamide-imides as well as blends with poly(aryl ether ketones). Copolymers with improved stress-cracking resistance are also known in the art including, for example, co-poly(biphenyl ether sulfone) resins comprising bisphenol A moieties as disclosed and described in U.S. Pat. No. 5,164,166.

Poly(biphenyl ether sulfone) resins are known for their good mechanical properties at elevated temperatures and they have excellent high temperature stability. These resins may be combined with suitable flame retardant additives to provide highly desirable chemically-resistant, flame retardant, low heat release materials for use in aircraft interiors and the like, as disclosed in U.S. Pat. No. 5,204,400, and are particularly useful for these purposes when employed in blends with poly(arylether ketones).

Because of their excellent mechanical and thermal properties, coupled with outstanding hydrolytic stability, the poly(aryl ether sulfone) resins have been utilized in the medical market for a variety of medical devices for at least ten years. One of the major requirements for materials used in such devices is the ability to be steam autoclaved repeatedly without loss of properties. Steam autoclaving is a very severe test, requiring both high temperature and hydrolytic stability, and involving cyclical effects—wet/dry, hot/cold. The poly(aryl ether sulfones) known as PES and PSF show some important deficiencies in this regard. Parts molded from these materials stress-crack when steam sterilized under stresses of say 500 psi or greater, especially when excessive concentrations of boiler additives such as morpholine are employed to reduce corrosion in the steam generating system, or when placed in contact with commonly used hospital cleaners and detergents.

Poly(biphenyl ether sulfone) resins and parts molded therefrom are widely recognized to have substantially better properties than PES or PSF resins in this regard. However, these resins are substantially more expensive than PES or PSF resins due to the high cost of biphenol. Considerable effort has gone into developing lower cost materials for medical uses with resistance to chemical and environmental attack equivalent to that of poly(biphenyl ether sulfone) resins. In U.S. Pat. No. 5,164,466 blends of poly(biphenyl ether sulfone) resins with polysulfone resins are disclosed to have substantial resistance to steam sterilization only at a high level of the poly(biphenyl ether sulfone) component. Similarly, blends comprising poly(biphenyl ether sulfone) and PES resin, disclosed in U.S. Pat. No. 5,086,130, do not have the requisite environmental stress crack resistance when the poly(biphenyl ether sulfone) component is less than about 40 wt %. Blends presently available for use in medical applications thus will necessarily be formulated to contain a major proportion of the more expensive poly (biphenyl ether sulfone) resin. Development of improved materials having the desired combination of mechanical properties and chemical resistance for use in the production of steam sterilizable articles suitable for medical uses would be an important advance in the resin arts.

BRIEF SUMMARY OF THE INVENTION

This invention is directed to ternary blends comprising a poly(biphenyl ether sulfone) resin, a polysulfone resin (PSF) and a poly(ether sulfone) resin (PES) having excellent environmental resistance including resistance to repeated steam sterilization, and to a method for producing steam sterilization-resistant, moldable compositions by combining readily available PSF and PES resins with particular levels of a poly(biphenyl ether sulfone) resin to form a blend. Molded articles comprising such blends have excellent mechanical properties together with the resistance toward steam sterilization that generally is considered to be characteristic of poly(biphenyl ether sulfone) resins alone, and are produced at lower cost.

DETAILED DESCRIPTION OF THE INVENTION

Briefly, the ternary blends of this invention will comprise up to 50 wt % poly(biphenyl ether sulfone) (PPSF) resin, together with a polysulfone resin (PSF) and a poly(ether sulfone) resin (PES).

The poly(biphenyl ether sulfone) or PPSF resin component useful in the practice of this invention will comprise the biphenylether sulfone structural unit

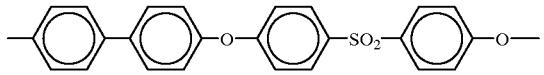

Poly(biphenyl ether sulfone) may be a homopolymer, or may be a copolymer further comprising up to 50 mole percent, preferably up to about 25 mole percent, still more preferably no more than about 10 mole percent additional arylene sulfone units with the structure

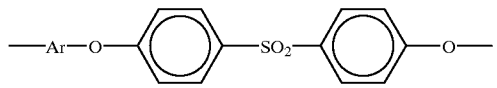

wherein Ar is a monoarylene moiety such as p-phenylene, m-phenylene or the like, or is a diarylene moiety other than biphenyl such as, for example, a moiety derived from bisphenol A, bisphenol S or similar bisphenol. The presence of these additional arylene sulfone units may have a detrimental effect on the overall balance of properties, hence polymers containing substantially only biphenylether sulfone structural units will generally be preferred.

The poly(ether sulfone) or PES resin component useful in the practice of this invention will comprise the phenylether sulfone structural unit

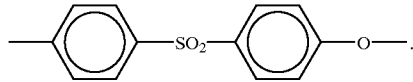

The PES resin may be a homopolymer containing the structural unit

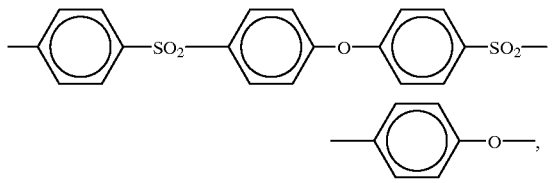

or may be a copolymer comprising greater than 50 mole percent said structural unit together with up to 50 mole percent, preferably up to about 30 mole percent, still more preferably from about 5 to about 25 mole percent additional arylene sulfone units having the structure

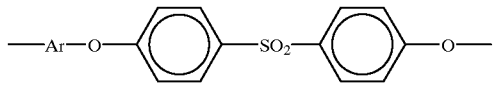

wherein Ar is a monoarylene moiety such as p-phenylene, m-phenylene or the like, or is a diarylene moiety other than phenylether sulfone moiety of bisphenol S such as, for example, the diarylene moiety of bisphenol A or a biphenyl moiety. The presence of these additional diarylene sulfone units may have a detrimental effect on the overall balance of properties, hence polymers containing phenylether sulfone structural unit and from 0 to about 30 mole percent arylenesulfone units wherein Ar is a monoarylene group such as p-phenylene will generally be preferred.

The polysulfone (PSF) resin component useful in the practice of this invention will comprise the structural unit

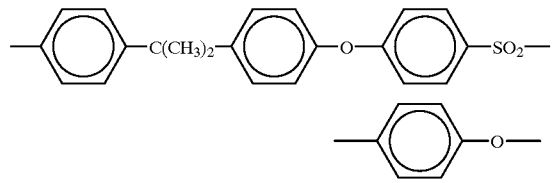

The polysulfone may be a copolymer comprising greater than 50 mole percent said structural unit together with up to 50 mole percent, preferably up to about 25 mole percent, still more preferably no more than about 10 mole percent additional arylene sulfone units with the structure

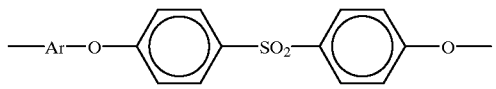

wherein Ar is a monoarylene moiety such as p-phenylene, m-phenylene or the like, or is a diarylene moiety other than the 2,2'-diphenylpropane moiety of bisphenol A such as, for example, a biphenyl moiety, a diphenylether moiety, or the phenylether sulfone moiety of bisphenol S.

Poly(biphenyl ether sulfone), PSF and PES homopolymer and copolymer resins suitable for the purposes of this invention are widely known in the art, and such resins may be readily obtained from a variety of commercial sources. Alternatively, the poly(biphenyl ether sulfone), PSF and PES resin components may be prepared by any of the variety of methods well known in the art for the preparation of poly(aryl ether) resins. Two methods, the carbonate method and the alkali metal hydroxide method, are widely known and used for this purpose. In the alkali metal hydroxide method, disclosed for example in U.S. Pat. No. 4,108,837 and in U.S. Pat. No. 4,175,175, a double alkali metal salt of a dihydric phenol is contacted with a dihalobenzenoid compound in the presence of a dipolar, aprotic solvent under substantially anhydrous conditions. The carbonate method, in which at least one dihydric phenol and at least one dihalobenzenoid compound are heated, for example, with sodium carbonate or bicarbonate and a second alkali metal carbonate or bicarbonate is also widely disclosed in the art, for example in U.S. Pat. No. 4,176,222.

The reduced viscosity of the poly(biphenyl ether sulfone), PSF and PES resins useful in the practice of the invention, measured in an appropriate solvent such as methylene chloride, chloroform, N-methylpyrrolidone or the like, will be at least 0.3 dl/g, preferably at least 0.4 dl/g and film forming. Generally, resins having a reduced viscosity in the range of from about 0.3 to about 1.0 dl/g will be readily processable thermally and will be useful for these purposes. Very high molecular weight resins, typically those having a reduced viscosity greater than about 1.0 dl/g, may also be found useful, however, such resins will have a high melt viscosity and be difficult to process and will not be preferred.

The blends of the invention will comprise from about 50 to about 5 wt % poly(biphenyl ether sulfone), based on total weight of the three resin components. Preferably, the blends will comprise no more than about 40 wt % of the poly (biphenyl ether sulfone) component. Although blends containing higher levels of poly(biphenyl ether sulfone) may be found to exhibit excellent chemical and environmental resistance characteristics, molded articles comprising blends containing lower levels of the poly(biphenyl ether sulfone) resin will generally be lower in cost to produce, hence high levels of the poly(biphenyl ether sulfone) resin will not be preferred.

The balance of the ternary blend will comprise from about 50 to about 95 wt % of the PES and PSF resin components, based on total weight of the three resin components. Generally, the weight ratio of PES to PSF in the blend will be in the range of from about 1:2 to about 3:1, preferably from about 1:1 to about 2:1, and still more preferably from about 1.5:1 to about 2:1. Although the chemical and environmental resistance of these blends, including steam sterilizability, will be excellent over a wide range of PES:PSF ratios, the balance of mechanical properties, and particularly thermal resistance as reflected in HDT values, will be significantly affected by the level of the component having the lower HDT, i.e. the polysulfone or PSF component. At PES:PSF ratios less than about 1:1.5 the HDT value for the blend becomes undesirably low for many applications. Ternary blends wherein the PES:PSF ratio is as great as 1:2 or even greater may find application where thermal resistance is not a primary consideration, however, such blends will not be preferred in producing molded articles intended for use in medical devices or in similar applications.

The blend compositions of this invention may be prepared by any conventional mixing method commonly employed in the resin compounding art. For example, the poly(biphenyl ether sulfone), PES and PSF resins may be combined in powder or granular form and fed to an extruder and extruded into strands. The strands may then be chopped to provide pellets for use in a subsequent molding operation.

It will be obvious to those skilled in the art that the invented compositions may be further compounded with other additives as is conventionally practiced in the resin arts, including plasticizers; pigments; flame retardant additives, reinforcing fillers other reinforcement such as glass or carbon fibers or the like, thermal-oxidative stabilizers; ultraviolet light stabilizers, processing aids, impact modifiers and the like. The blends of this invention may also be found attractive for use in providing flame retardant resin formulations comprising flame retardants containing zinc borates in combination with fluorocarbon polymers and, optionally, titanium dioxide such as are disclosed in U.S. Pat. No. 5,204,400.

The invention will be better understood by considering the following examples. These examples are offered to illustrate various embodiments of the invention, but are not intended to limit the scope thereof.

EXAMPLES

The component materials employed in following examples, and the abbreviations therefor, include:

PPSF: Poly(biphenyl ether sulfone) containing units of the formula

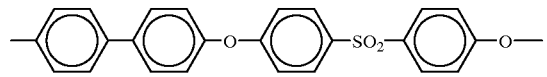

obtained. as RADEL-R® polysulfone resin from Amoco Polymers, Inc. Grades employed for these Examples include R-5 100 and R-5700.

PES: Poly(aryl ether sulfone) homopolymer containing structural units of the formula

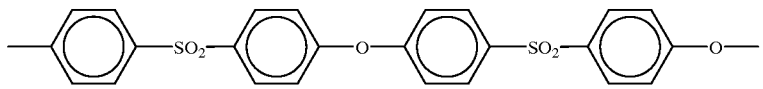

PES-A: Poly(aryl ether sulfone) copolymer containing structural units of the formula

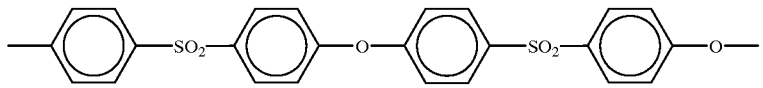

and about 25 mole % structural units of the formula

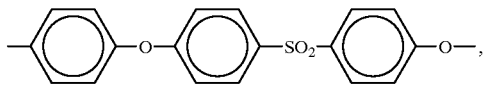

obtained. as RADEL-A® polysulfone resin from Amoco Polymers, Inc.

PSF: Polysulfone containing structural units of the formula

-continued

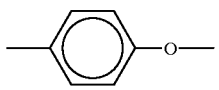

obtained. as UDEL® polysulfone resin from Amoco Polymers, Inc.

Blend Preparation, Molding and Testing

All materials were prepared by first dry blending the components using a mechanical blender, drying in a dehumidified air oven at 300° F. for about 16 hr. (overnight), then compounding using a Berstorff ZE-25, 25 mm co-rotating twin-screw, double vented extruder fitted with a double strand die. The polymer extrudate was pelletized after passing through a water trough for cooling. Processing conditions varied with the materials compounded; extruder barrel temperatures were in the range 290–365° C.; die temperature from 335–355° C.; melt temperature from 350–395° C. Screw speeds were in the range 170 to 250 rpm.

Standard ASTM test specimens for each of the compounded materials, dried again overnight, were injection molded on Battenfeld or Arburg injection molding machines having 3 ounce injection capacities.

Tensile testing was carried out in accordance with ASTM-D638; Heat deflection temperature (HDT) was determined in accordance with ASTM-D648, Izod impact strength in accordance with ASTM-D256, Flexural strength and flexural modulus by following the procedures of ASTM-D790, and Tensile impact by ASTM-D1822.

Examples 1–3

In Examples 1–3, blends comprising PPSF poly(biphenyl ether sulfone), PES-A and PSF resins in ratios over a range from 75/25 to 25/75, together with Comparison Examples A–C and Control Examples D-1 and D-2 comprising the base resins, were prepared, molded and tested for chemical resistance and mechanical properties.

The blend compositions and the results of the testing are summarized in Table 1.

The blends of Comparison Examples A–C are typical of binary resin blends found commercially useful in producing molded articles for medical devices. It will be seen from a comparison of mechanical properties that the overall strength, rigidity and flexural properties for the molded articles comprising the ternary blends of Examples 1–3 are substantially equivalent to those comprising the comparison binary blends.

Ductility and toughness of the invented blends is quite adequate for a wide variety of uses. Tensile impact, a discriminating test of polymer unnotched toughness, is similar for all compositions. Notched Izod impact provides a test of notch sensitivity; even though the ternary blends of this invention are more notch sensitive than PPSF (Control Example D-1) or a binary blend comprising a high level of PPSF (Comparison Example A), the invented blends are quite comparable to the remaining binary blend comparison specimens in that regard.

Molded articles comprising the blends of the invention and articles comprising the comparison blends were subjected to steam sterilization testing and compared.

To assess the steam sterilization resistance of the invented blend compositions, the following test was employed: molded 5 inch by ½ inch ASTM bars, ⅛ inch thick, were mounted by fixing the bar horizontally from one end in a cantilever fashion, and a weight was suspended on the free end. The weight attached to the specimen was such that a maximum flexural stress of about 1000 psi was generated at the fixed end surface of the bar. The samples which were mounted side by side in a stainless steel drawer were then placed in a steam autoclave. The autoclave was operated at a steam pressure of 27 psig, and a temperature of 270° F., and the autoclave chamber was charged with water containing 50 part per million (ppm) morpholine. Each autoclave cycle consisted of a 5-minute heat-up and pressurization step followed by a hold at the set conditions for 30 minutes after which the autoclave was vented and allowed to cool down for 10 minutes. The samples were typically inspected at the completion of 15–25 cycles and all samples were tested in duplicates.

Table II summarizes the results from the steam sterilization performance study.

TABLE I

Poly(biphenyl ether sulfone) Blends

| | | 1 | 2 | 3 | A | B | C | D-1 | D-2 |
|---|---|---|---|---|---|---|---|---|---|
| PPSF[1] | pbw | 50 | 37.5 | 25 | 70 | 50 | 50 | 100 | — |
| PES-A resin | pbw | 25 | 37.5 | 50 | — | — | — | — | — |
| PES resin | pbw | — | — | — | — | — | 50 | — | 100 |
| PSF resin | pbw | 25 | 25 | 25 | 30 | 50 | — | — | — |
| Tensile Str. | kpsi | 11.0 | 11.5 | 11.4 | 10.7 | 10.6 | 11.0 | 10.3 | 12.1 |
| Tensile Mod. | kpsi | 337 | 367 | 370 | 335 | 338 | 346 | 337 | 402 |
| Elong.-yield | % | 8.7 | 8.6 | 8.3 | 8.8 | 8.1 | 6.0 | 7.5 | 6.3 |
| Elong.-break | % | 59 | 77 | 49 | 90 | 82 | 107 | 109 | 36 |
| Flex. Str. | kpsi | 16.8 | 17.6 | 17.2 | 15.8 | 16.0 | 14.9 | 12.8 | 16.2 |
| Flex. Mod. | kpsi | 361 | 385 | 371 | 352 | 356 | 386 | 339 | 402 |
| Izod impact | | | | | | | | | |
| notched | ft-lb/in | 3.0 | 2.3 | 2.3 | 16.4 | 2.4 | 2.5 | 16.0 | 1.3 |
| unnotched | ft-lb/in | n.b. | n.b. | n.b. | n.b. | n.b. | n.b. | n.b. | n.b. |
| Tens. impact | ft-lb/in$^2$ | 188 | 202 | 189 | 226 | 189 | 222 | 235 | 175 |
| HDT @ 264 psi | ° C. | 199[1] | 203[1] | 205[1] | 200[1] | 187[2] | 205[1] | 204[1] | 208[1] |

Notes: 1: HDT bars annealed at 190° C. for one hour; 2: HDT bars annealed at 180° C. for one hour.
For composition and compounding details and test methods, see text.

TABLE II

Steam Sterilization - Poly(biphenyl ether sulfone) Blends

| Ex. No. | PPSF pbw | PES-A pbw | PES pbw | PSF pbw | Steam Sterilization cycles | observations |
|---|---|---|---|---|---|---|
| 1 | 50 | 25 | — | 25 | 1000 | no change |
| 2 | 37.5 | 37.5 | — | 25 | 1000 | no change |
| 3 | 25 | 50 | — | 25 | 1000 | no change |
| A | 70 | — | — | 30 | 1000 | no change |
| B | 50 | — | — | 50 | 1000 | no change |
| C | 50 | — | 50 | — | 1000 | no change |
| E | 25 | — | 75 | — | 166 | rupture |
| F | 25 | — | — | 75 | 250 | rupture |
| D-2 | — | — | 100 | — | 45 | rupture |
| D-3 | — | — | — | 100 | 150 | rupture |
| D-4 | — | 100 | — | — | 275 | rupture |

Quite unexpectedly, ternary blends with as little as 25 pbw of PPSF (Example 3) perform as well in the steam sterilization testing as the binary blends of Comparison Examples A–C comprising 50 and 70 pbw of PPSF. None showed any evidence of stress cracking following 1000 cycles of steam sterilization as described above.

Binary blends comprising only 25 pbw PPSF (see Comparison Example E, with PES, and Comparison Example F, with PSF) experienced a rupture after only 166 and 250 cycles, respectively. The neat poly(arylether sulfone) resins failed after 45 cycles (PES, see D-2) and 275 cycles (PES-A, see D-4), and the polysulfone resin failed after 150 cycles (PSF, see D-3).

Accordingly, a blend composition comprising from about 5 to about 50 weight percent PPSF and from about 50 to about 80 weight percent of a blend of PES and PSF resins will have improved resistance to steam containing amine stabilizers. The excellent resistance to steam sterilization cycling observed for the invented blends is particularly surprising and unexpected in view of the poor to steam sterilization cycling of binary blends of poly(arylether sulfone) resin or PSF resin containing a low level of PPSF resin.

The invention will thus be seen to be a molding composition comprising from about 50 to about 5 wt % poly(biphenyl ether sulfone), based on total weight of the three resin components, together with from about 50 to about 95 wt % of PES and PSF resin components. Generally, the weight ratio of PES to PSF in the blends will be in the range of from about 1:2 to about 3:1. More preferably, blends according to the invention will comprise from about 5 to about 40 wt % of the poly(biphenyl ether sulfone) component, together with from about 60 to about 95 wt % PES and PSF resins in a weight ratio of from about 1:1.5 to about 2:1, still more preferably from about 1.5:1 to about 2:1.

Although the invention has been described and illustrated by way of specific embodiments set forth herein, still further modifications and variations will be readily apparent to those skilled in the resin formulating and composite fabricating art, and such variations and modifications will be understood to lie within the scope of the invention as defined by the appended claims.

I claim:

1. A molding composition comprising from about 5 to about 40 wt % poly(biphenyl ether sulfone) comprising structural units

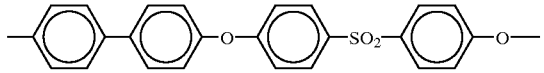

and up to about 25 mole % additional arylene sulfone units, a poly(ether sulfone) comprising greater than 50 mole % structural units

a polysulfone comprising greater than 50 mole % structural units

wherein the weight ratio of said poly(ether sulfone) to said polysulfone is in the range of from about 1:2 to about 3:1.

2. The molding composition of claim 1 wherein said poly(ether sulfone) comprises structural units of the formula

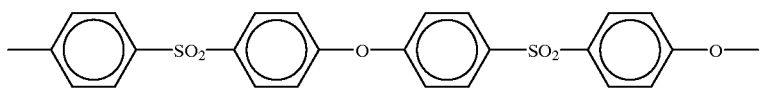

and from 0 to about 30 mole percent structural units of the formula

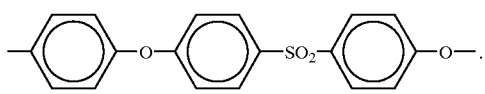

3. The molding composition of claim 1 wherein the weight ratio of said poly(ether sulfone) to said polysulfone is in the range of from about 1:1.5 to about 2:1.

4. The molding composition of claim 1 wherein said poly(biphenyl ether sulfone) consists of said structural units

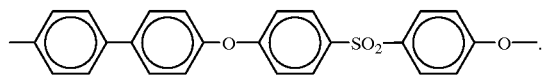

5. A molded article comprising a ternary resin blend of poly(biphenyl ether sulfone), poly(ether sulfone) and polysulfone, said blend containing from about 5 to about 40 wt % said poly(biphenyl ether sulfone).

6. A molding composition comprising from about 5 to about 40 wt % poly(biphenyl ether sulfone) consisting of structural units

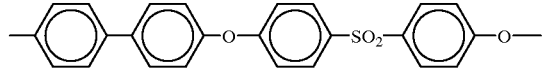

a poly(ether sulfone) comprising structural units

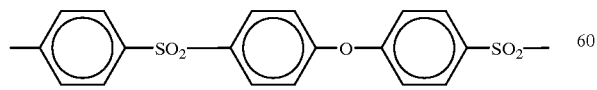

a polysulfone consisting of structural units

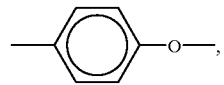

wherein the weight ratio of said poly(ether sulfone) to said polysulfone is in the range of from about 1:2 to about 3:1.

7. The molding composition of claim 6 wherein said poly(ether sulfone) contains structural units of the formula

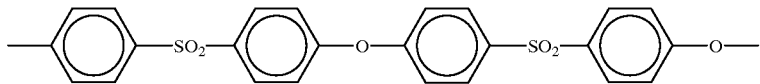

and from about 0 to about 30 mole percent structural units of the formula

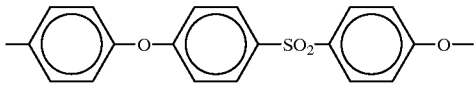

* * * * *

UNITED STATES PATENT AND TRADEMARK OFFICE
CERTIFICATE OF CORRECTION

PATENT NO.: 6,075,100
DATED: June 13, 2000
INVENTOR(S): M. Jamal El-Hibri

It is certified that error appears in the above-identified patent and that said Letters Patent is hereby corrected as shown below:

| Col. | Line | | |
|------|------|---|---|
| 6 | 31 | "include R-5  100 and" should read: "include R-5100 and" | |
| 10 | 35 | "   " should read: "and" | |
| 11 | 66 | "   " should read: "and" | |

Signed and Sealed this

Twenty-second Day of May, 2001

Attest:

NICHOLAS P. GODICI

Attesting Officer     Acting Director of the United States Patent and Trademark Office